United States Patent
Branco et al.

(10) Patent No.: US 12,468,922 B2
(45) Date of Patent: Nov. 11, 2025

(54) AUTOMATIC PROFILE EXTRACTION IN DATA STREAMS USING RECURRENT NEURAL NETWORKS

(71) Applicant: Feedzai - Consultadoria e Inovação Tecnológica, S.A., Coimbra (PT)

(72) Inventors: Bernardo José Amaral Nunes de Almeida Branco, Lisbon (PT); Jacopo Bono, Esposende (PT); João Tiago Barriga Negra Ascensão, Lisbon (PT); Pedro Gustavo Santos Rodrigues Bizarro, Lisbon (PT)

(73) Assignee: Feedzai - Consultadoria e Inovação Tecnológica, S.A. (PT)

( * ) Notice: Subject to any disclaimer, the term of this patent is extended or adjusted under 35 U.S.C. 154(b) by 961 days.

(21) Appl. No.: 17/586,461

(22) Filed: Jan. 27, 2022

(65) Prior Publication Data

US 2022/0245426 A1    Aug. 4, 2022

Related U.S. Application Data (60) Provisional application No. 63/143,253, filed on Jan. 29, 2021.

(30) Foreign Application Priority Data

Dec. 29, 2021  (PT) .......................................... 117712
Jan. 25, 2022  (PT) .......................................... 117759

(51) Int. Cl.
*G06N 3/044* (2023.01)
*G06N 3/045* (2023.01)
*G06N 3/08* (2023.01)

(52) U.S. Cl.
CPC ............. *G06N 3/044* (2023.01); *G06N 3/045* (2023.01); *G06N 3/08* (2013.01)

(58) Field of Classification Search
CPC .......... G06N 3/044; G06N 3/045; G06N 3/08; G06Q 20/4016
See application file for complete search history.

(56) References Cited

U.S. PATENT DOCUMENTS 9,652,772 B1   5/2017   Eyges
9,773,227 B2   9/2017   Zoldi (Continued)

OTHER PUBLICATIONS

Javad Forough et al., Ensemble of deep sequential models for credit card fraud detection, Applied Soft Computing vol. 99, Nov. 7, 2020, https://doi.org/10.1016/j.asoc.2020.106883, 11 pages, Nov. 7, 2020 (Year: 2020).*

(Continued)

*Primary Examiner* — Barbara M Level
(74) *Attorney, Agent, or Firm* — Van Pelt, Yi & James LLP (57) ABSTRACT

In various embodiments, a process for automatic profile extraction in data streams using recurrent neural networks includes receiving input sequence data associated with a stream of events and using a plurality of trained recurrent neural network machine learning models at least in part in parallel to determine different embedding output sets that represent at least a portion of the input sequence data in a plurality of different embedding spaces. The process includes providing the different embedding output sets to one or more classifier machine learning models to determine one or more classifier results, and using the one or more classifier results to provide a prediction output.

18 Claims, 8 Drawing Sheets

(56) References Cited

U.S. PATENT DOCUMENTS

| | | | |
|---|---|---|---|
| 10,102,530 B2 | 10/2018 | Zoldi | |
| 10,721,350 B1* | 7/2020 | Maiorana | G10L 15/22 |
| 2018/0248895 A1* | 8/2018 | Watson | G06N 7/01 |
| 2018/0276541 A1* | 9/2018 | Studnitzer | G06Q 40/04 |
| 2019/0354836 A1* | 11/2019 | Shah | G06N 3/045 |
| 2020/0090003 A1 | 3/2020 | Marques | |
| 2020/0120110 A1* | 4/2020 | Stokes, III | H04L 63/1416 |
| 2020/0314101 A1* | 10/2020 | Zhang | H04L 63/1433 |
| 2021/0027300 A1* | 1/2021 | Chetia | G06Q 20/4016 |
| 2021/0200955 A1* | 7/2021 | Ben Kimon | G06N 3/044 |
| 2021/0224648 A1* | 7/2021 | Zhuang | G06N 3/044 |
| 2022/0044119 A1* | 2/2022 | Wang | G06N 3/045 |
| 2024/0112015 A1* | 4/2024 | Inzelberg | G06N 3/045 |
| 2024/0303468 A1* | 9/2024 | Branco | G06Q 20/4016 |

OTHER PUBLICATIONS

Babaev et al., WO2020/242340 A1, published Dec. 3, 2020, filed Sep. 5, 2019, Method of Calculating a Client's Credit Card Rating. (Year: 2019).*

Bahnsen et al., Feature Engineering Strategies for Credit Card Fraud Detection, Expert Systems with Applications 51 (2016) 134-142.
Branco et al., Interleaved Sequence RNNs for Fraud Detection, Applied Data Science Track Paper, KDD '20, Aug. 23-27, 2020.
Dal Pozzolo et al., Cred Card Fraud Detection: A Realistic Modeling and a Novel Learning Strategy, IEEE Transactions on Neural Networks and Learning Systems, vol. 29, No. 8, 2018, pp. 1-14.
Jurgovsky et al., Sequence Classification for Credit-card Fraud Detection, Expert Systems with Applications 100 (2018) 234-245, Jan. 23, 2018.
Liu et al., Fraud Detection via Behavioral Sequence Embedding, Knowledge and Information System, Springer, Jan. 9, 2020.
Sutskever et al., Sequence to Sequence Learning with Neural Networks, Dec. 14, 2014, pp. 1-9.
Van Vlasselaer et al., Apate: A Novel Approach for Automated Credit Card Transaction Fraud Detection using Network-Based Extensions, Decision Support Systems 75 (2015) 38-48.
Wang et al., APAN: Asynchronous Propagation Attention Network for Real-Time Temporal Graph Embedding, Dec. 16, 2020.
Whitrow et al., Transaction Aggregation as a Strategy for Credit Card Fraud Detection, 2009, Data Mining and Knowledge Discovery 18 (02 2009), pp. 30-55.

* cited by examiner

AUTOMATIC PROFILE EXTRACTION IN DATA STREAMS USING RECURRENT NEURAL NETWORKS

CROSS REFERENCE TO OTHER APPLICATIONS

This application claims priority to U.S. Provisional Patent Application No. 63/143,253 entitled SYSTEM FOR AUTOMATIC PROFILE EXTRACTION FOR FINANCIAL CRIME DETECTION IN DATA STREAMS filed Jan. 29, 2021 which is incorporated herein by reference for all purposes.

This application claims priority to Portugal Provisional Patent Application No. 117712 entitled SYSTEM FOR AUTOMATIC PROFILE EXTRACTION FOR FINANCIAL CRIME DETECTION IN DATA STREAMS filed Dec. 29, 2021, which is incorporated herein by reference for all purposes.

This application claims priority to Portugal Provisional Patent Application No. 117759 entitled AUTOMATIC PROFILE EXTRACTION IN DATA STREAMS USING RECURRENT NEURAL NETWORKS filed Jan. 25, 2022, which is incorporated herein by reference for all purposes.

BACKGROUND OF THE INVENTION

Machine learning models are useful to classify, score, or otherwise make decisions about data. For example, machine learning models can be trained and deployed in detection systems to analyze transactional data made up of events and detect a security breach. When classifying events as valid or invalid, the context or typical behavior of various entities involved in a transaction can be considered. An event that appears to be valid in one context may appear invalid in another. Traditionally, context is determined using entity profiles, which are features extracted from transactional data of that entity and that characterize its typical behavior. However, profiles are challenging to implement because they typically require manual engineering of profile features, large storage capacity, and complex state management. Therefore, profiles and systems that incorporate profiles require extensive resources and consequently can be inefficient or slow.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some machine learning classification exercises, it is helpful to examine the context of the data. "Context," as used in this disclosure, refers to the characteristics or typical behavior of entities associated with the data. For example, in a fraud detection system, the context of various entities, e.g., card, merchant, device, etc., involved in a transaction may be useful for classifying transactions as valid/secure (e.g., legitimate) or invalid/insecure (e.g., fraudulent). A transaction that appears to be normal (likely legitimate) in one context may appear suspicious (potentially fraudulent) in another. Suppose a transaction happens from a specific device, using a specific account and buying from a specific merchant. Context in this example includes the characteristic behavior of the device, account, and merchant. If the transaction deviates from the characteristic behavior of one or more entities, then it could indicate suspicious behavior.

Contextual features (sometimes called "profile features") are determined using "profiles" (sometimes called "behavioral profiles"). Transactional data is processed to determine or extract a profile corresponding to the transactional data. Conventional techniques for determining profiles typically either require manual engineering of profile features or use recurrent neural network embeddings (sometimes simply called "embeddings"). On the one hand, manual engineering of profile features is laborious and slow. Moreover, using profiles in production requires extensive computational resources, e.g. to store large states, and it is usually unfeasible to compute profiles in real time for multiple entities simultaneously. On the other hand, it is difficult or impossible to obtain a multi-entity context from embeddings when working with large datasets and training a single recurrent neural network, as is usual. This is because sampling and/or grouping the data by one entity will inevitably lead to incomplete sequences for the other entities, making it impossible to train a recurrent neural network with full view of all entities.

Moreover, systems typically need to meet Service Level Agreements (SLAs) in production, such as latencies on the order of milliseconds, which limits the permitted computational complexity of the systems. For example, current approaches typically meet the latency requirements by computing contextual features in real-time for only the primary entity of interest (usually the card) while adding information on other entities only periodically and after sampling operations. These coarser views on context have a detrimental effect on detection performance. Therefore, conventional techniques are unable to compute accurate context for multiple entities and simultaneously make the context available at decision time for all entities. In other words, it is possible to update information in real-time for only a single entity, while information for other entities are updated at most periodically.

Embodiments of the present disclosure provide automatic profile extraction in data streams using recurrent neural networks. A process for automatic profile extraction includes receiving input sequence data associated with a stream of events. The process includes using a plurality of trained recurrent neural network machine learning models (RNNs) at least in part in parallel to determine different embedding output sets that represent at least a portion of the input sequence data in a plurality of different embedding spaces. The process includes providing the different embedding output sets to one or more classifier machine learning models to determine one or more classifier results, and using the one or more classifier results to provide a prediction output.

In various embodiments, the disclosed techniques compute a profile in real-time for any number of entities and at a constant cost per entity, which can be parallelized. The disclosed techniques address both the training and deployment challenges discussed herein. As further described with respect to FIG. 2B, a system for automatic profile extraction includes:

Various RNNs, each trained separately to embed context for a different (specific/respective) entity; and A classifier that combines the outputs of the (multiple parallel) RNNs to determine the multi-entity context of a particular event.

The output of the classifier can be used to provide a prediction output such as discriminating between fraudulent and legitimate events for fraud detection. The system is scalable, and efficiently stores and updates context embeddings for any entity in real-time. For example, both the context extraction as well as database operations such as read and write occur in parallel for each entity in various embodiments.

Figure 1:
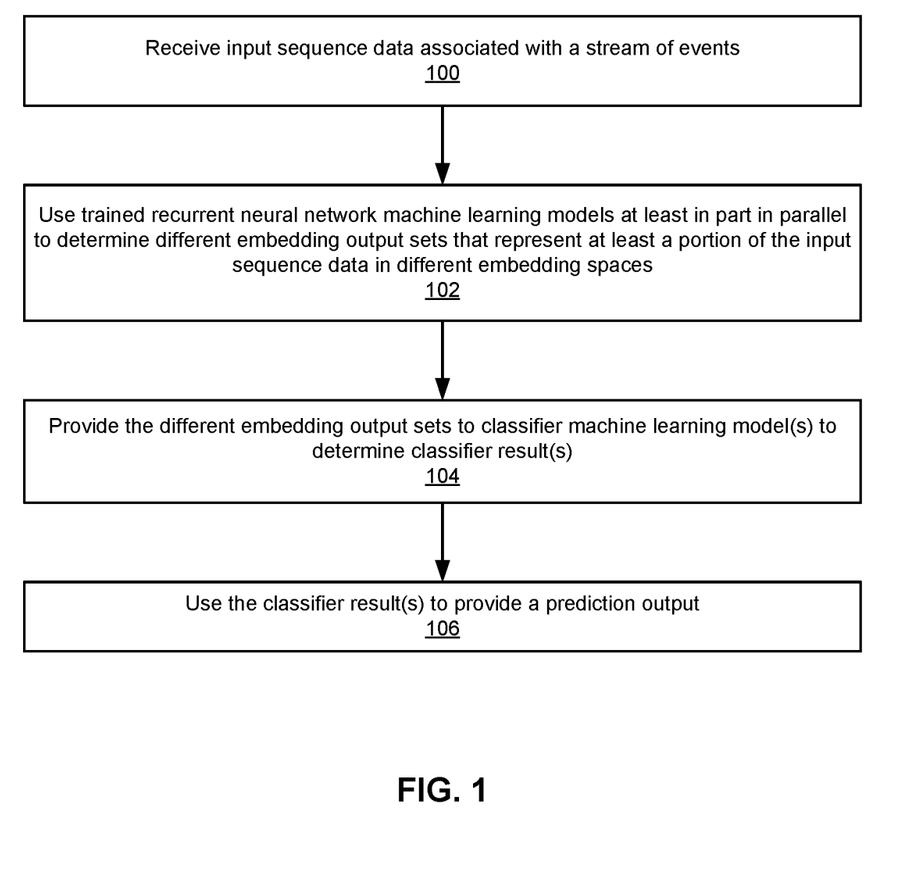
FIG. 1 is a flow diagram illustrating an embodiment of a process for automatic profile extraction using recurrent neural networks.

FIG. 1 is a flow diagram illustrating an embodiment of a process for automatic profile extraction using recurrent neural networks. The process can be performed by a system such as the one shown in FIG. 2B or a processor such as the one shown in FIG. 8.

The process begins by receiving input sequence data associated with a stream of events (102). For example, in a fraud detection use case, each event in the stream of events is a transaction such as a credit card purchase made at a point of sale. A first event is a first transaction at a first point in time, a second event is a second transaction at a second point in time, etc., where each transaction has associated entities such as card, merchant, device, etc. Some examples of transactions are further described with respect to FIG. 6. As further described herein, the input sequence data can be received and processed in real-time (or near real-time), or can be historical data such as for training machine learning models.

The process uses a plurality of trained recurrent neural network machine learning models at least in part in parallel to determine different embedding output sets that represent at least a portion of the input sequence data in a plurality of different embedding spaces (104). Determining an embedding output set corresponding to input sequence data is sometimes referred to as "learning embeddings." The process learns embeddings for the input sequence data. An embedding summarizes the relevant sequential information or context. As further described herein, context refers to a characteristic of an entity. Context can be historic or other characteristics of an event such as IP address, average amount of transactions performed by an entity (e.g. a merchant) within a specified time window (e.g. one week), etc.

An embedding output set (sometimes simply called an "embedding") refers to mappings of the input sequence data to one or more embedding spaces. For example, an embedding maps (represents) at least a portion of the input sequence data in an embedding space of lower dimension than an original input space of the input sequence data. Semantically similar inputs are embedded closely together (quantified by, e.g., the Euclidean or cosine distance). An embedding space is constructed where the relevant information is encoded in the location of a point in this space, and the distance between points represents the degree of relatedness/similarity between inputs. In other words, related/similar inputs are close to each other in the embedding space. The embedding contains all the relevant information in lower dimensionality so that downstream tasks such as classification can be more easily performed. For example, it is easier for a downstream classifier to work with the reduced space of the embedding output set compared with the original input space of the input sequence data.

An advantage of using embeddings as disclosed herein instead of conventionally-generated profiles is that embeddings can be updated in real-time regardless of how many entities are used (e.g., card, merchants, locations, etc.). By contrast, in conventional approaches, only a single profile type (e.g., card) can be updated in real-time while the other profile types (e.g., merchant and location) can be updated only periodically. The reason is that, for large datasets, the data is typically stored in a distributed way and computing profile features for multiple entities requires data shuffling operations that are computationally too expensive to perform in real time.

A recurrent neural network machine learning model (RNN) can be used to learn embeddings. The state (sometimes called "hidden state") of a RNN encodes the context of an event in a sequence. That is, the RNN summarizes historical context in its state and captures behavior in a specific time window. In other words, the state of a RNN is a specific implementation of an embedding since it learns to store the information of the past events needed for a present task. An example of using an RNN to determine embedding output sets is further described with respect to FIG. 2B.

As further described herein, the disclosed techniques provide RNNs that learn embeddings for several entities in parallel unlike conventional systems that typically learn embeddings for only a single entity. To learn, for various entities, the context that is most useful to detect fraud, multiple RNNs can be trained on data sequenced by those entities. Event data, which has corresponding various entities, is ingested in parallel by each RNN, where each RNN corresponds to a specific entity and learns embeddings for its specific entity. Parallelizing the training of the various RNNs allows the learning of embeddings for more than one entity in constant time. An example of an RNN including a process for updating states is further described with respect to FIGS. 2B and 5.

Learned embeddings can be combined in various ways to determine a result such as a prediction.

The process provides the different embedding output sets to one or more classifier machine learning models to determine one or more classifier results (106). In various embodiments, in practice, one or more trained classifier machine learning models use the embedding output set (vectors) as inputs and (optionally) relevant raw features such as transaction amount to determine one or more classifier results.

Figure 2B:
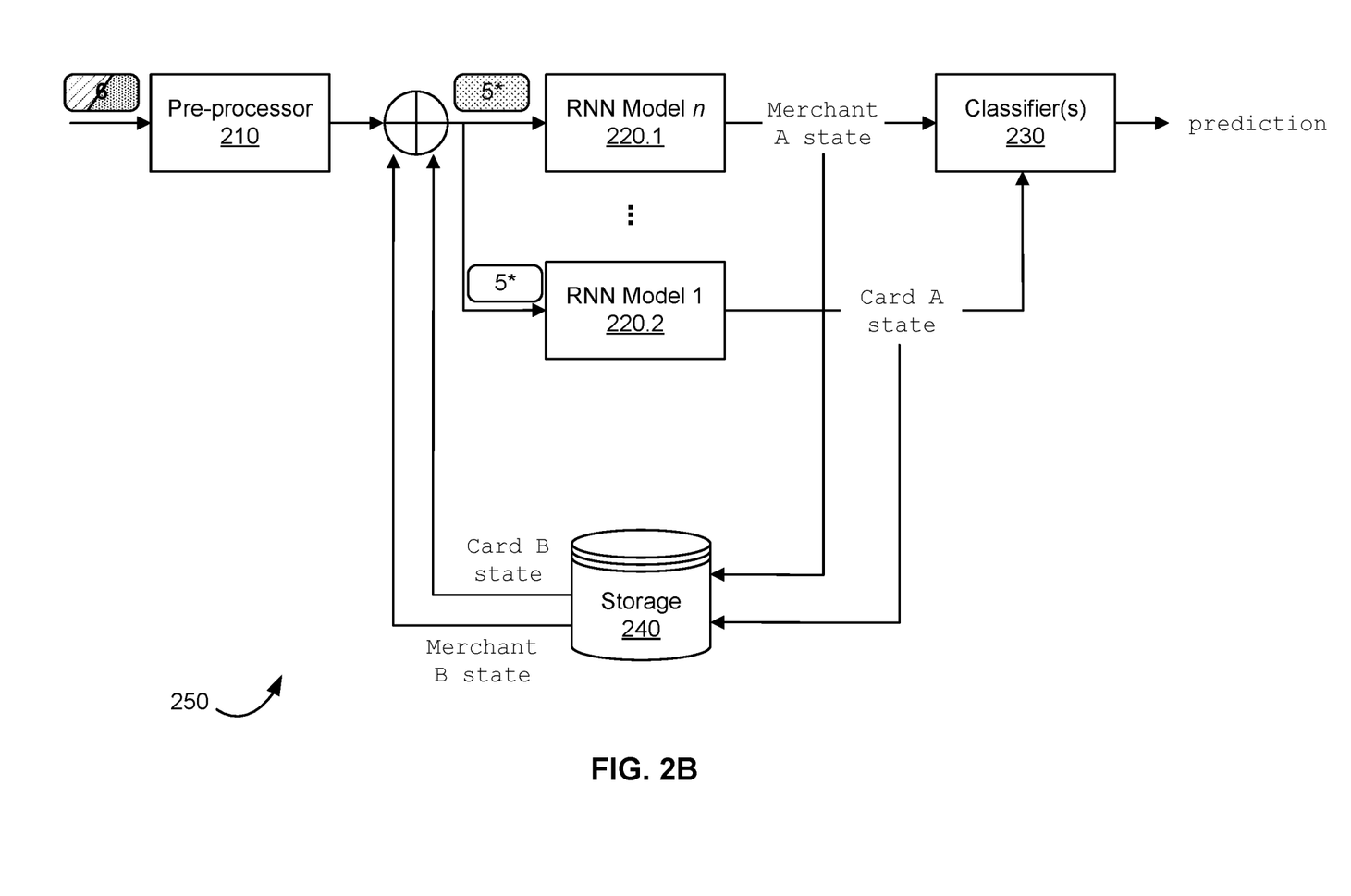
FIG. 2B is a block diagram illustrating an embodiment of a system for automatic profile extraction in data streams using recurrent neural networks.
Figure 3:
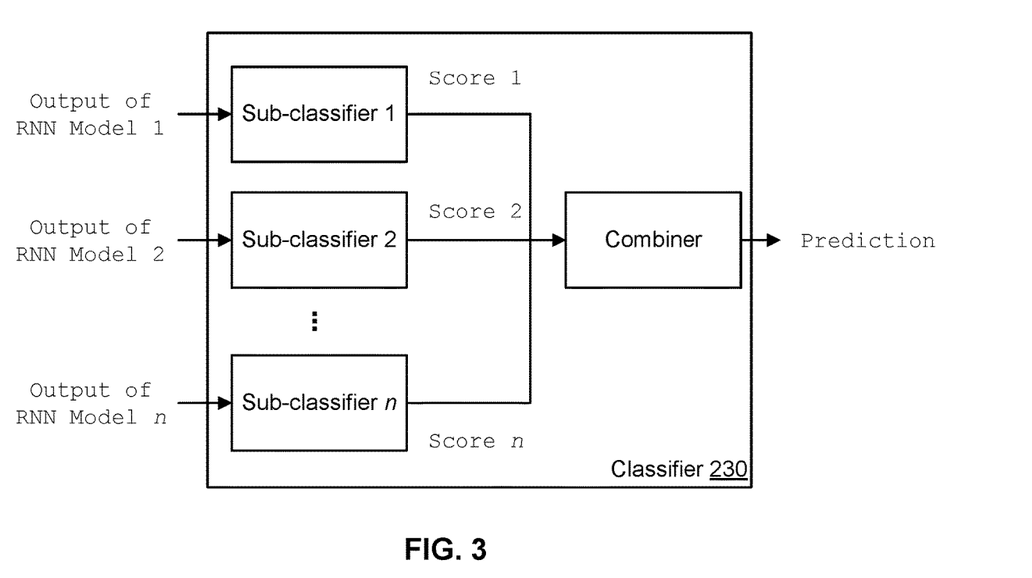
FIG. 3 is a block diagram illustrating an embodiment of a classifier having sub-classifiers for automatic profile extraction in data streams using a recurrent neural network.

A classifier result can be a value such as a score that can be further processed to determine a prediction output (106) or can be directly used as a prediction output. In a fraud detection use case example, a classifier result is a score that quantifies the probability that a corresponding event is fraudulent. In various embodiments, the classifier results can be combined by training a machine learning model, as further described with respect to FIGS. 2B, 3, and 4. Referring to FIG. 3, classifier results Score 1, Score 2, . . . , Score n can be combined by the Combiner (which in this example is a trained machine learning model).

Alternatively, the classifier results can be combined without needing to train another machine learning model. Referring to FIG. 3, classifier results Score 1, Score 2, . . . , Score n can be combined by the Combiner (which in this example is not a trained machine learning model). By way of non-limiting example, combinations include averaging scores, using the highest score, using the cumulative score (summing the scores of all classifiers), or using a majority vote as follows. A threshold is chosen for each of the classifiers, and used to binarize the classifier results (Score 1, Score 2, . . . , Score n) into 0 if the score is below the threshold or 1 if the score is above the threshold. A majority vote is then defined as the binarized output with largest occurrence over the individual classifiers.

Figure 4:
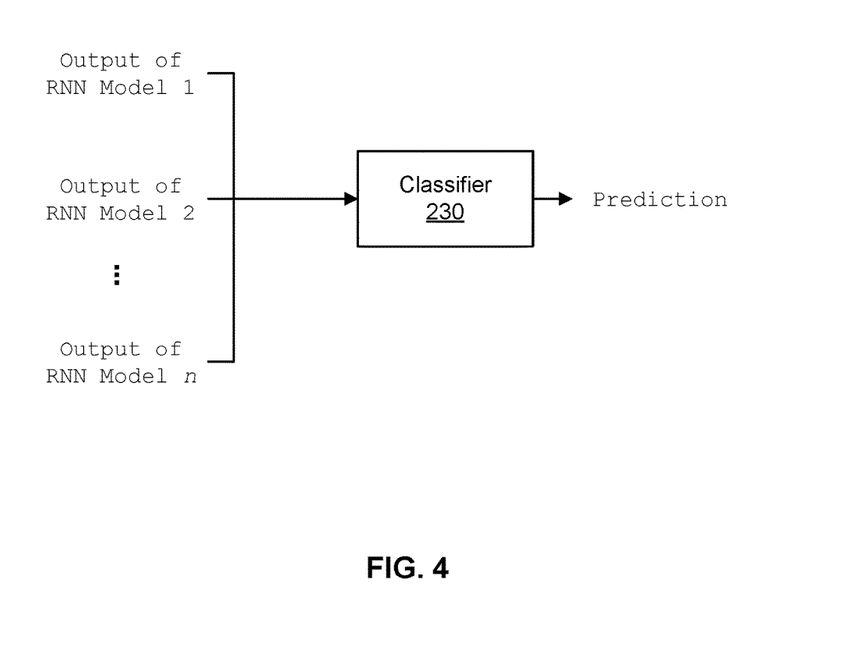
FIG. 4 is a block diagram illustrating an embodiment of a classifier for automatic profile extraction in data streams using a recurrent neural network.

The process uses the one or more classifier results to provide a prediction output (106). In the example of a separate classifier for each embedding output (an example of which is shown in FIG. 3), scores output by each separate classifier are combined (e.g., ensembled) to produce a final score. This approach could leverage pre-defined heuristics, which dictate how scores should be combined, or by simple models that learn how to weigh the various scores using historical data. For example, some entities may be more heavily weighted than others, e.g., if they are considered more indicative of (or important for determining) a characteristic such as suspicious behavior than other entities. In the example of a single classifier (an example of which is shown in FIG. 4), the model extracts the relevant information from each entity embedding to determine a final score indicating a prediction output.

Figure 2A:
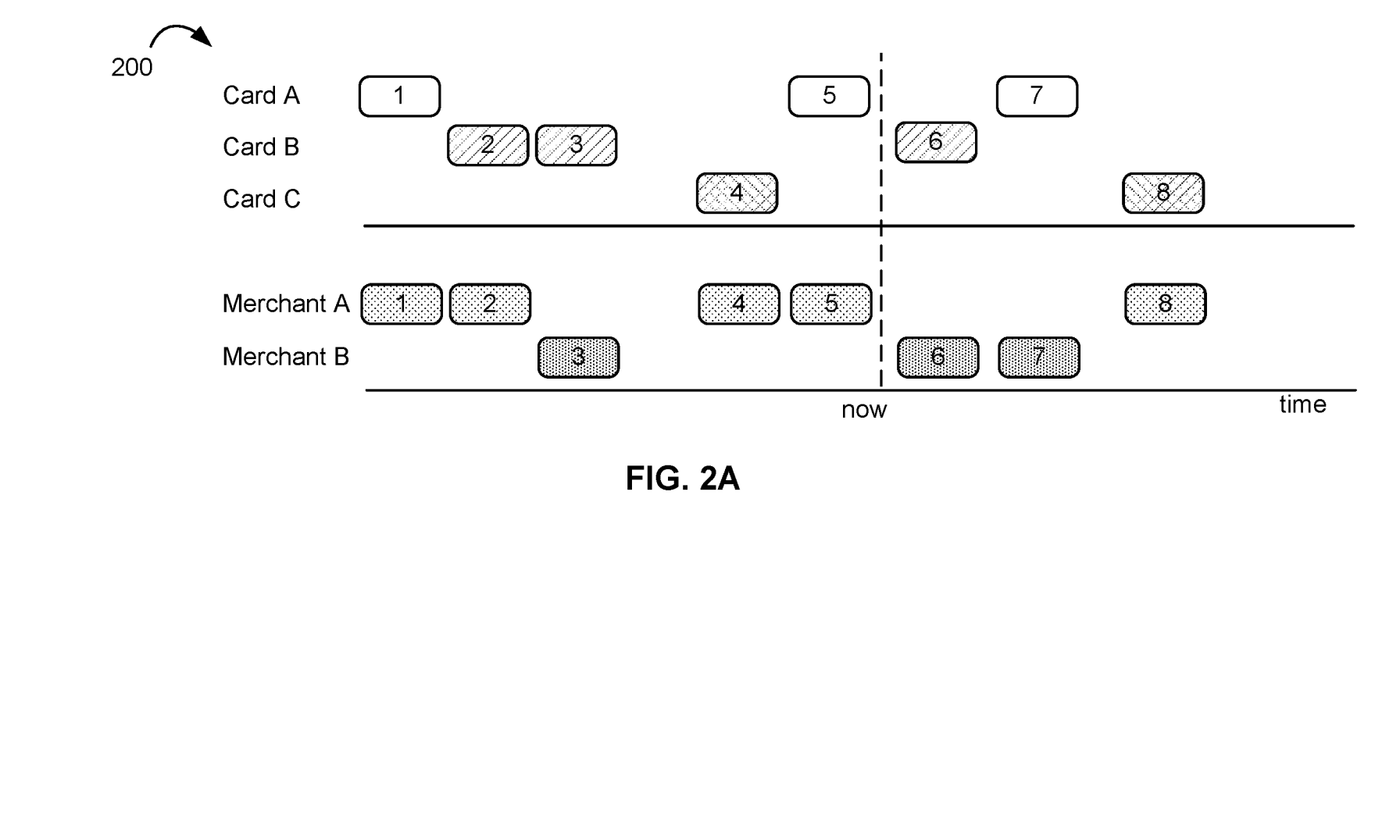
FIG. 2A shows an example of a data stream that can be processed by a system for automatic profile extraction in data streams using recurrent neural networks according to an embodiment of the present disclosure.

FIG. 2A shows an example of a data stream that can be processed by a system for automatic profile extraction in data streams using recurrent neural networks according to an embodiment of the present disclosure. The data stream 200 is an example of a stream of events that can be processed according to a process such as the one shown in FIG. 1. The data stream 200 of FIG. 2A can be processed by a system such as the one shown in FIG. 2B.

Data stream 200 includes events (numbered 1 to 8) that are sequenced by card (top) and by merchant (bottom). Input sequence data refers to data associated with the stream 200 of events. Each different type of data is represented by different shading. For example, Card A data is white, Card B data is hatched, Card C data has cross-hatching. Similarly, Merchant B data is shaded darker than Merchant A data. In this example, first input sequence data includes all data associated with Event 1, which involved Card A and Merchant A. Second input sequence data includes all data associated with Event 2, which involved Card B and Merchant A. Third input sequence data includes all data associated with Event 3, which involved Card B and Merchant B, and so on. The two views (Card vs. Merchant) show the value of contextual information when detecting fraudulent behavior. Event 6 can be determined to be fraudulent because the context of Event 6 is that it is associated with Card B and Merchant B.

Data stream 200 is merely exemplary and not intended to be limiting. The disclosed techniques can efficiently process various types of data streams including those composed of many interleaved, unbounded sub-sequences (e.g., the history of each card) with irregular time intervals between transactions. In an interleaved sequence, transactions received in an order in which adjacent transactions are not necessarily associated with the same entity.

FIG. 2B is a block diagram illustrating an embodiment of a system for automatic profile extraction in data streams using recurrent neural networks. System 250 includes pre-processor 210, a group of one or more RNN models 220.1 and 220.2 (the group is collectively referred to as 220), one or more classifiers 230, and storage 240.

Pre-processor 210 (sometimes also called a feature engineering and transformation block) is configured to process data and can be performed prior to or substantially concurrently with fetching the data. Pre-processing including one or more feature engineering and data transformation functions. For example, if raw data is an IP address, pre-processing can determine features from an IP address such as an associated country.

Each RNN model in the group 220 is configured to compute one or more states associated with an entity. In various embodiments, multiple RNNs are trained separately, each RNN specializing in sequences of events of a particular entity (e.g., card, merchant). In other words, each of the RNNs is configured to learn context for a respective (specific) entity. After training the RNNs, they can be used to evaluate a holdout set, and the RNN states corresponding to each event in this holdout set can be stored.

For example, a first one of RNNs 220.2 is configured for a first entity (Card), a second one of the RNNs 220.1 is configured for a second entity (Merchant), etc. RNN 220.2 determines a first embedding output set based on the received input sequence data (for Cards), and RNN 220.1 determines a second embedding output set based on the received input sequence data (for Merchants). For example, RNN 220.2 computes states associated with a Card and RNN 220.1 computes states associated with a Merchant.

RNNs work well for sequential data since the network's output (the state) at a given time step will be an input for the next timestep. In this way, the RNNs compress, in the state, all information of previous events needed for a current task. Consequently, the cost of prediction at each timestep is constant, regardless of the sequence's size, as only the latest RNN state and the incoming event are needed to make a prediction. Examples of RNNs include Long Short-Term Memory (LSTM) and Gated Recurrent Unit (GRU). Any machine learning model that behaves like an RNN and works well for sequential data can be used. Moreover, the system is highly scalable.

In other words, unlike conventional techniques that only retrieve one state from one database, techniques of the present disclosure retrieve n states in parallel. These n states correspond to the n different entities for which the system is computing profiles. This figure (along with FIG. 2B) shows an example of applying the disclosed techniques for two entities in a financial crime detection system. Since reading entries from modern data storages is fast, and since these reads can be done in parallel, the extra cost of retrieving more than one state in terms of latency is negligible. By doing so, the system can build and use these embedded recurrent states as profiles, in real-time, for the various entities that participate in an event.

An advantage of training the RNNs separately is that the preprocessing, training, and evaluation steps can be parallelized. The RNNs can be trained using supervised or unsupervised training. The RNNs find application in a variety of settings, such as being integrated into a fraud detection system in production, an example of which is described with respect to FIG. 6.

Leveraging the (hidden) states of RNNs to automatically determine profile features according to the disclosed techniques allows a more complete context to be available in real-time, for every event, with negligible extra cost to the production environment. Classifier 230 is configured to make a prediction about the input transaction using output (state associated with an entity) from the group of RNN models 220. The classifier uses the states of RNNs and (optionally) a selection of raw input features, to determine a final prediction.

In various embodiments, the classifier 230 includes sub-classifiers, each sub-classifier corresponding to a respective RNN model in the group 220. The outputs of the sub-classifiers are combined to obtain a prediction. An example of a classifier with sub-classifiers is further described with respect to FIG. 3. In various embodiments, classifier 230 is configured to extract the relevant information from each RNN model and determine classifier result(s), which in turn can be used to determine a predictive output. An example of this type of classifier is further described with respect to FIG. 4.

Storage 240 is configured to store states associated with entities (e.g., Card A RNN state, Merchant A RNN state, Card B RNN state, Merchant B RNN state, etc.) In various embodiments, the storage includes one or more databases, which can be centrally stored or embedded. The storage optionally includes a cache, which may increase the speed of lookups.

In operation, at the time denoted by "now" in FIG. 2A, the system of FIG. 2B has processed Event 5 and stored the updated Merchant A and Card A states in data storage 240. The system then joins Event 6 with the Card B state and the Merchant B state (as represented by the two types of shading), and each is processed by the respective RNN model. According to the disclosed techniques, data can be preprocessed in parallel and each entity-RNN can be trained and evaluated in parallel so that no extra compute time is needed compared to using a single RNN. In this example, RNN Model n is responsible for the Merchant entity and ingests raw merchant data (shaded 5*), while RNN Model 1 is responsible for the Card entity and ingests raw card data (white 5*). Reading from and writing to storage 240 can be performed in parallel for the various states, resulting in constant cost. This system is therefore scalable and can be easily expanded to more than two RNNs. In various embodiments, each of the RNN's states is updated in real time, so the entity-contexts are available in real-time for all entities.

Suppose at the present time (indicated by "now"), Transaction 5 has just been received and transaction 6 is coming in. Transaction 5 is associated with Card A, so system 250 processes this transaction by performing the process of FIG. 1 to look up Card A RNN state (e.g., joining Transaction 5 with Card A RNN state) and output a prediction about that transaction using Card A RNN state. The system 250 also updates Card A RNN state based on Transaction 5, as further described herein.

Transaction 6 is associated with Card B, so system 250 processes this transaction by performing the process of FIG. 1 to look up Card B RNN state (e.g., joining Transaction 6 with Card B RNN state) and output a classification about that transaction using Card B RNN state. The system 250 also updates Card B RNN state based on Transaction 6, as further described herein.

FIG. 3 is a block diagram illustrating an embodiment of a classifier having sub-classifiers for automatic profile extraction in data streams using a recurrent neural network. In this example, there is a separate classifier machine learning model for each embedding. For example, one sub-classifier is trained per RNN-embedding. Each classifier (Sub-classifier 1 through Sub-classifier n) determines a score for a respective RNN model output. The scores are combined by the Combiner to determine a prediction output as further described with respect to 106. In other words, separate classifiers, one per embedding, each outputs a score. For example, Sub-classifier 1 is for the Card entity, Sub-classifier 2 is for the Merchant entity, and Sub-classifier n is for the Device entity. The scores determined by each sub-classifier can then be combined using average, max or similar operations, or by inputting them into simple classifiers such as, but not limited to, logistic regression. In various embodiments, the Combiner also uses one or more raw features to generate the prediction output.

FIG. 4 is a block diagram illustrating an embodiment of a classifier for automatic profile extraction in data streams using a recurrent neural network. In this example, a single classifier machine learning model extracts relevant information from each embedding and outputs a final score, which is used at 106 to provide a prediction result. For example, the RNN-embeddings are used as inputs to a classifier, which is trained to extract the relevant information and produce a score. In other words, the process directly passes the embeddings into a model trained to extract the relevant information from each entity embedding, which directly outputs a final score.

Figure 5:
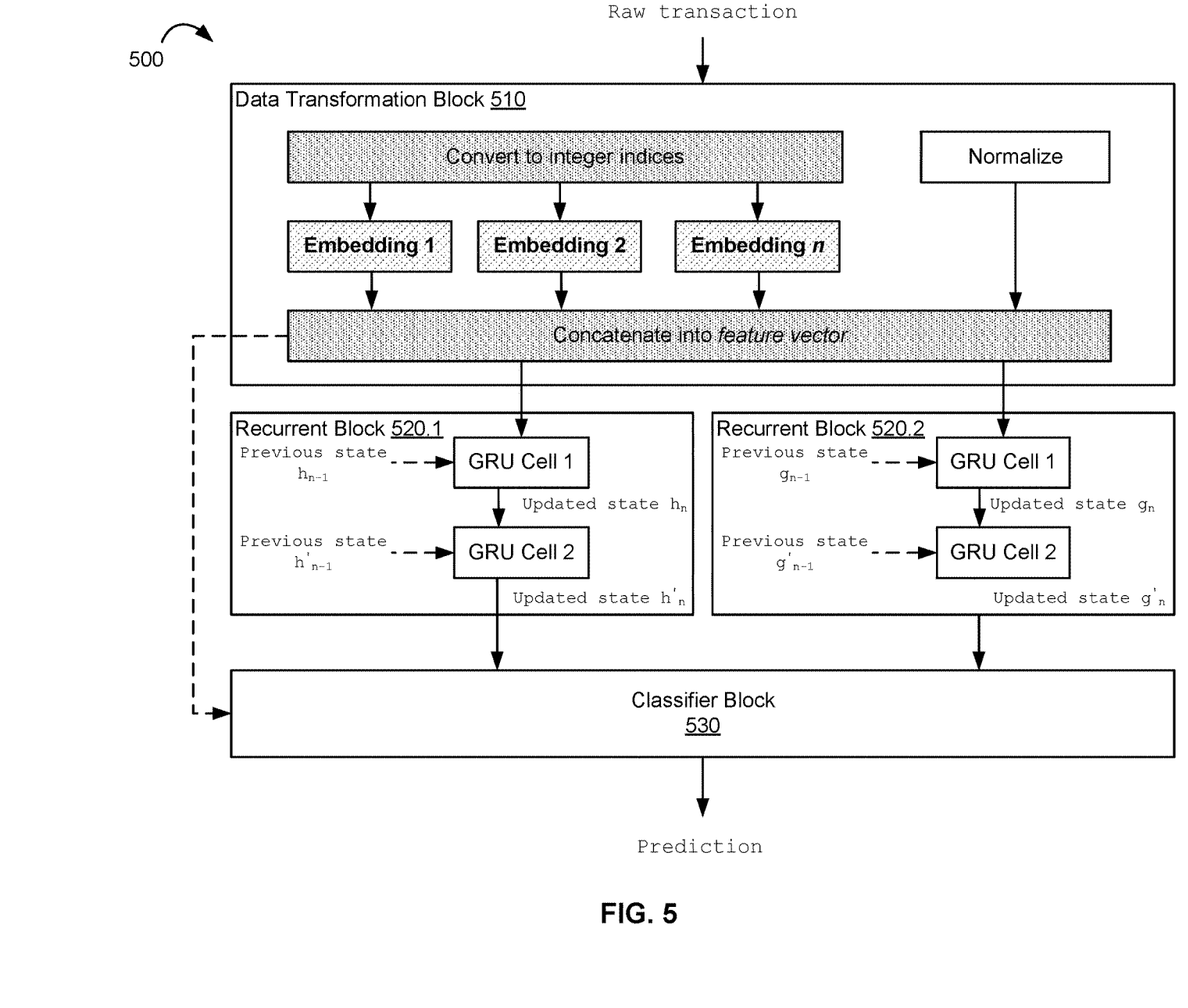
FIG. 5 is a block diagram illustrating an embodiment of a system for fraud detection using a recurrent neural network.

FIG. 5 is a block diagram illustrating an embodiment of a system for fraud detection using a recurrent neural network. System 500 includes a feature engineering and transformation block 510, one or more recurrent blocks 520.1 and 520.2 (collectively referred to as recurrent block 520), and a classifier block 530. Some components are referred to as "offline components" because they perform model training, and batch prediction. Some components are referred to as "online components" because they generate predictions for a stream of in-coming transactions under rigorous throughput and latency constraints. The two types of components support the model iteration cycle and the deployment of trained models. First, the architecture and the hyperparameters of the model are adjusted offline. Then, the model is deployed in an environment that fits the production constraints for real-time systems processing transactions.

Feature engineering and transformation block 510 is configured to pre-process data (e.g., a raw transaction) before passing the data to recurrent block 520. The data transformations, denoted by block fin equation 3, are depicted here. The darker-shaded transformations (conversion and concatenation) are not learnable, and as such, can be precomputed before training in the offline scenario, as further described herein. By contrast, the lighter-shaded transformations (embeddings) are learnable and are not precomputed before training. It includes one embedding block per categorical feature which maps integer indices to vectors in a dense space of predefined dimension. A predefined number of mappings can be performed according to memory constraints, e.g., k=10000 most common values for each categorical to their embedding. The remaining values may be mapped to the same embedding.

The transformations are concatenated. The resulting feature vector is passed through a fully connected layer to reduce its dimensionality before feeding it to the recurrent block.

Each of the recurrent blocks 520.1 and 520.2 is configured to learn the transaction patterns of the entities and embed this information in recurrent states. Each of the recurrent blocks 520.1 and 520.2 include a GRU, where the GRU contains one or more GRU cells (e.g., a single GRU cell or stacked GRU cells), and where the output of the first cell becomes the input of the next cell. The state sizes and number of GRU cells may be selected based on the storage capacity of the system. The larger the recurrent states, the larger the required database and resulting resources. As further described herein, in various embodiments, the database has as many entries per card as the number of stacked GRU cells. As a result, the recurrent block can be tuned to maximize the fraud detection results while respecting the resource restrictions of the production system. In the example shown here, there are two GRUs 520.1 and 520.2 with two stacked GRU cells. The number of recurrent blocks is merely exemplary and not intended to be limiting. Additional GRUs may be added to the system by configuring them in a similar manner to 520.1 and 520.2.

Classifier block 530 is configured to make a prediction (or classification) of the input raw transaction using the information from one or more previous states. The classifier block 530 can be implemented as described with respect to FIGS. 3 and 4. Using FIG. 3 as an example in which a sub-classifier is trained per RNN-embedding using supervised training, the output of the recurrent block is concatenated with the initial feature vector so that the current prediction of the sub-classifier, $\hat{y}^{(i,k)}$, depends on $x^{(i,k)}$ directly and through the state $s^{(i,k)}$. This approach differs from conventional RNNs because it effectively "unloops" the RNNs so that residual information that is useful for the current transaction, but not necessarily for future events, does not need to be stored in the state. The concatenated vector passes through several fully connected layers. The classification of the sub-classifier can be provided in various formats such as a final score indicating likelihood that the transaction is fraudulent.

When processing large datasets (e.g., each dataset occupies several TBs of disk space), access and storage of data can be improved (accelerated) as follows. In various embodiments, an (embedded) key-value store (such as LMDB, RocksDB, or the like) is used to store the training, validation, and test datasets (each subset as a separate database). An embedded key-value store may be attractive because of its read performance. Instead of building random training batches of cards through several separate random reads, for every batch, an index of the database is accessed at random and read sequentially from there on batch size number of entries. This way, the model (system) consistently sees different batches during training in an efficient manner.

In various embodiments, a multi-processing strategy is used where various CPU workers are continuously and concurrently reading batches from the database and inserting them in a queue to be later consumed by the GPU. Batch processing in this manner is beneficial for imbalanced datasets where some batches do not have any fraudulent transactions. By continuously and concurrently reading batches, at every batch, the model sees some fraudulent transactions. Otherwise, back-propagating the gradients derived from a batch with no fraud would result in a model that simply predicts all transactions to be non-fraudulent.

The system builds two distinct databases, one of the cards with no fraudulent transactions (e.g., meeting a first criterion), and another with cards containing at least one fraudulent transaction (e.g., meeting a second criterion). In various embodiments, since the fraudulent database is much smaller than the non-fraudulent one, the fraudulent database is kept in memory (RAM) hence making the fraudulent reads, which occur for every batch, even faster. For the validation dataset, a new database of a random and representative sample of cards from the validation period (typically a month) arranged in descending order in the number of transactions is built. This allows the system to quickly find the batch size that maximizes the GPU's usage, and there is a constraint with having the model evaluate the transactions always in the same order.

In a production scenario, an RNN continuously updates its recurrent state from the very first transaction of an entity until its most recent one. In the offline batch scenario, forcing a model to classify the entire transactional history of an entity may be undesirable for two reasons. Firstly, the transactional history of some entities may be so long that it exceeds the GPU memory, whereas others may have only a few associated transactions. This disparity causes very irregular batches, and an inefficient usage of the GPU memory. Secondly, domain knowledge suggests that one does not need the entire history of an entity to decide if the current transaction is fraudulent. Because of this, a cutoff on the number of previous transactions of an entity can be used. In various embodiments, this cutoff (threshold) is empirically set, depending on the dataset and use-case, to establish a good compromise between GPU utilization and a sufficient history for the model to distinguish between the user's normal behavior and a fraudulent one. By way of non-limiting example, a suitable cutoff in the payment processor domain and for the card entity is within a range from 100 to 500 previous transactions. Consequently, batches have a fixed size in the number of transactions resulting from the number of cards (batch size) multiplied by the cutoff length. Furthermore, a motivation behind using long sequences is to mimic, as much as possible, the unbounded number of transactions, per entity, in production.

Although historical data may include transactions from all of their channels and use-cases, sometimes only scoring transactions from a specific subgroup is of interest. As an example, transactions can be either card-not-present (CNP) for online transactions or card-present (CP) for transactions in physical locations, and a model whose purpose is blocking CNP transactions is desired. Although the model is only scoring CNP transactions, it can still extract valuable information from CP transactions. More concretely, imagine a sequence of successive cash withdrawals followed by online purchases done in a short period. The model would be further inclined to detect this suspicious behavior if it had seen the CP transactions before the CNP ones. In various embodiments, this information is embedded directly into the training procedure through the use of scorable and non-scorable instances. A transaction that the model needs to learn how to classify goes through the typical forward pass, followed by a backward pass, e.g., backpropagation of the respective gradients. For a non-scorable instance, however, a forward pass is done, but the backward pass is not. As a result, with the forward pass, the recurrent state of the entity is updated with new information. The model does not learn how to classify the non-scorable instances, focusing solely on the target use-cases.

In various embodiments, the dataset is split into training, validation, and test subsets. Since this is a binary classification problem, the binary cross-entropy loss can be used to train the models. Given the data's size, an epoch is not an entire pass through the data in various embodiments. Instead, an epoch is a random sample, with replacement, of, approximately, 10% non-fraudulent cards and all fraudulent cards in the training data.

In various embodiments, predictions are determined for all events in a full period of data in the offline setting in order to obtain accurate, unbiased estimates of the performance of these models. It is similar to the validation process executed periodically during training as herein, with some differences. First, truncating sequences to the last m events is typically not feasible as a goal is to generate predictions for all transactions in a time window. Second, sequence randomness is not required since all sequences are evaluated.

Taking these two differences into account, sequences that do not contain any event in the time period are first filtered out. Then, the list of sequences is sorted by descending sequence length. This allows each batch to be composed of similarly-sized sequences, reducing the number of padded events. Finally, the batch size is adapted as the data is processed, starting with a small batch of lengthy sequences and progressively increasing the batch size as the length of the sequences decreases. Thus, the number of events in each batch remains similar, keeping the GPU memory usage stable (and high) over time.

Figure 6:
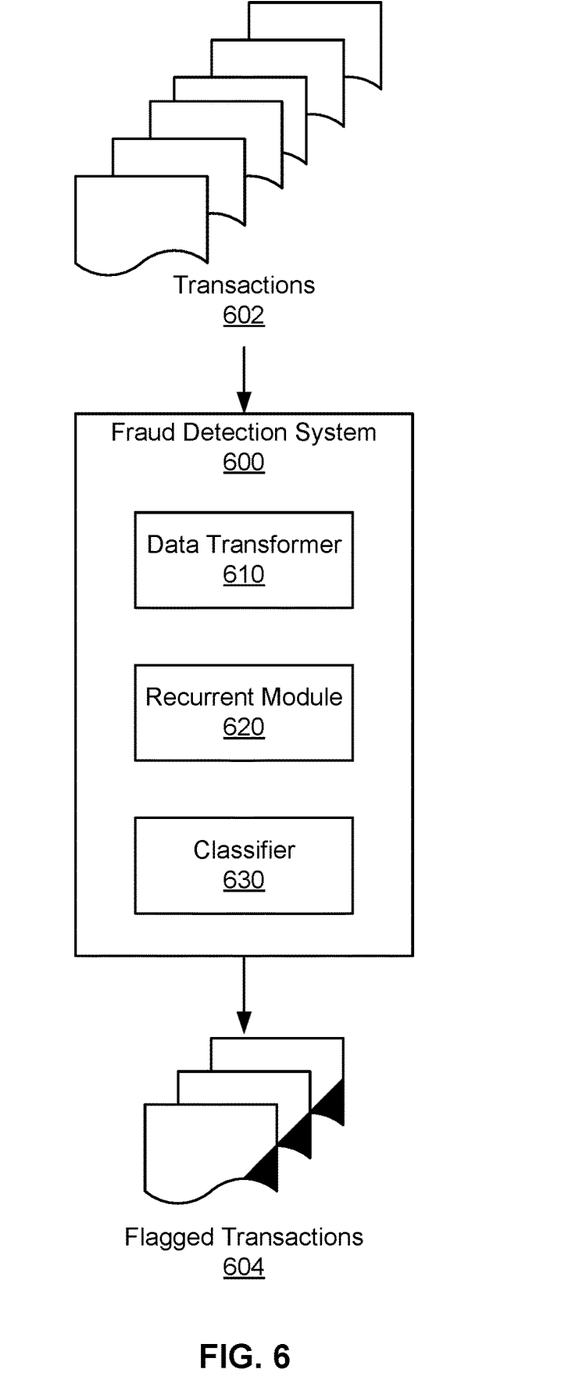
FIG. 6 is a block diagram illustrating an embodiment of a system for fraud detection using a recurrent neural network.

FIG. 6 is a block diagram illustrating an embodiment of a system for fraud detection using a recurrent neural network. Fraud detection system 600 receives transactions 602 and processes the transactions to determine actions (if any) to take with respect to the transactions.

In various embodiments, fraud detection system 600 is designed to detect fraud and similar security breaches in online transactions such as purchases. In a typical scenario, a fraudster obtains a payment instrument (such as by using a credit card skimmer at a point of sale device) and then tries to make unauthorized purchases using that payment instrument. Sometimes the legitimate cardholder detects the illicit usage and requests a chargeback or otherwise initiates a dispute to be reimbursed. Sometimes a merchant, credit card issuer, bank, or other entity involved in transaction processing uses a fraud detection system such as fraud detection system 600 to detect and prevent fraudulent transactions.

The effectiveness of a fraud detection system depends on its ability to quickly and accurately detect and prevent a fraudster from successfully completing a purchase or transaction. An effective fraud detection system preferably detects the fraud prior to a legitimate cardholder reporting the fraud or some other financial loss to a merchant, credit card issuer, bank, or other entity involved in the transaction. Ideally, the fraudster is thwarted by having the payment instrument declined when they try to use it.

Fraud detection system 600 receives transactions 602, makes predictions about the transactions such as whether they are fraudulent or legitimate, and outputs one or more flagged transactions 604. The flagged transactions 604 may be those that are potentially fraudulent, so the fraud detection system forwards them to a human or automated analyst, who investigates the transaction and makes a final decision about what action to take.

Unlike conventional fraud detection systems, system 600 is optimized by using one or more parallel recurrent neural networks to classify events and detect fraud. As further described herein, system 600 includes a data transformer 610, recurrent module 620, and classifier 630 that cooperate to perform the disclosed techniques including the process of FIG. 1. An example of data transformer 610 is pre-processor 210. An example of recurrent module 620 is RNN model 220. An example of classifier 630 is classifier 230. System 600 is efficient during both offline training and online, streaming classification.

The disclosed techniques can be implemented by system 600 to better recognize fraudulent transactions and/or legitimate transactions. Merchants, customers, financial institutions, and government agencies and others who suffer fraud-related losses including credit card theft and other scams would benefit from the techniques disclosed herein. A more detailed example of an environment in which a fraud detection system can be used is shown in FIG. 7.

Figure 7:
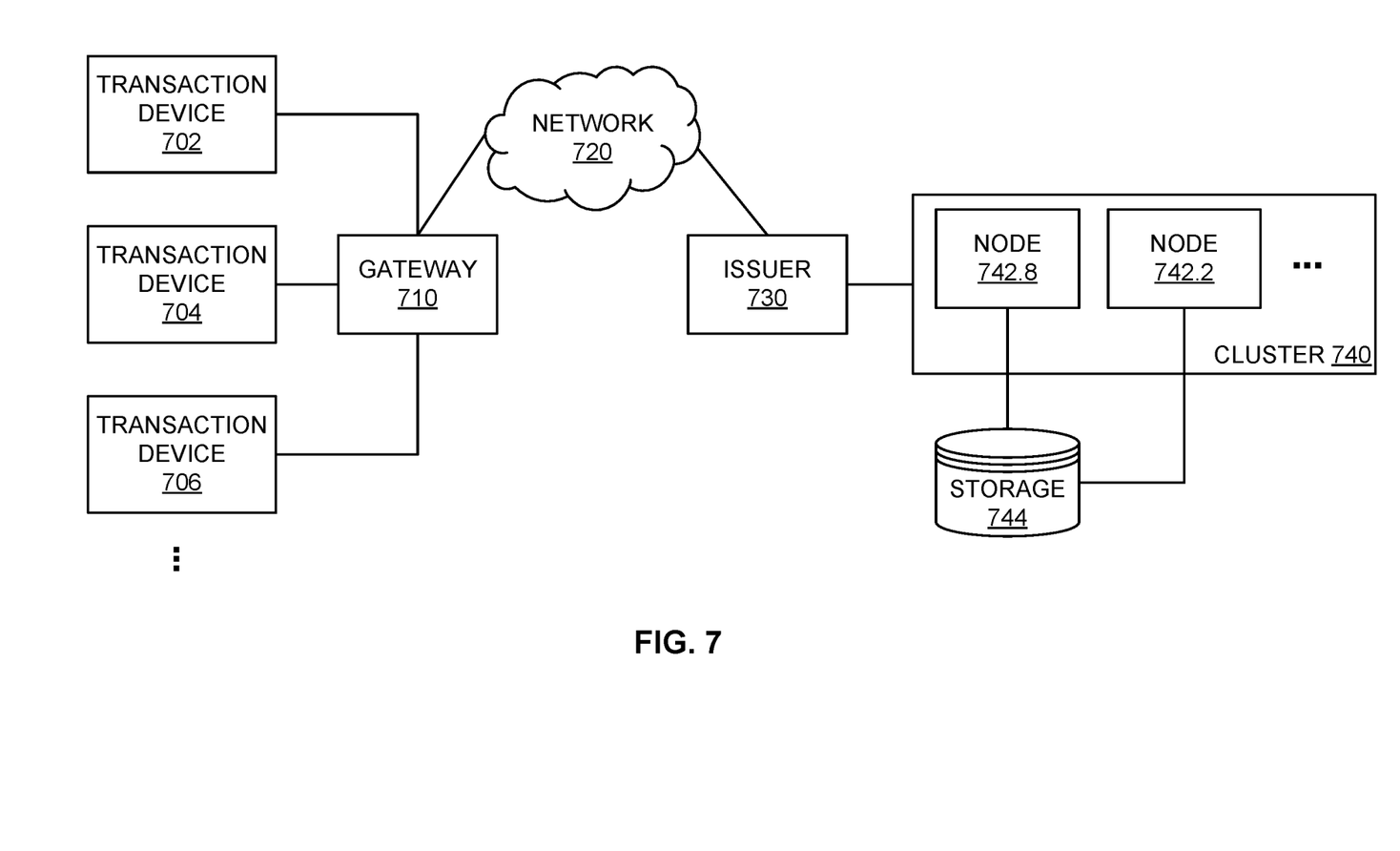
FIG. 7 is a block diagram illustrating an embodiment of a system in which automatic profile extraction using recurrent neural networks can be implemented.

FIG. 7 is a block diagram illustrating an embodiment of a system in which automatic profile extraction using recurrent neural networks can be implemented. The system includes one or more nodes in a cluster 740 that perform fraud detection. The environment includes one or more transaction devices 702, 704, 706, gateway 710, network 720, issuer 730, and a cluster 740 made up of one or more nodes 742.1, 742.2. Transaction devices 702-706 collect transaction data, and transmit the transaction data via gateway 710 to issuer 730. Issuer 730 verifies the transaction data to determine whether to approve the transaction. For example, processing a transaction involving a purchase includes receiving account information (e.g., credit/debit) and transaction details (e.g., purchase amount) at a transaction device and determining whether to approve the transaction. An approved transaction may mean that payment by the account is accepted in exchange for goods or services. A denied transaction may mean that payment by the account is denied.

In some embodiments, whether to approve or deny a transaction can be based on an assessment of the likelihood that the transaction is fraudulent by monitoring data streams using the techniques disclosed herein. In some embodiments, cluster 740 is configured to perform the techniques disclosed herein to detect anomalies and provide an indication (such as an alarm report) to issuer 730 or a third party such as a merchant.

By way of non-limiting example, transaction data may include one or more of: time of transaction, account/payment information (such as a credit card account number, a debit account number, or a bank account wire number), amount paid, currency, transaction location, merchant name, merchant address, category code, city, state, zip, country, terminal identification, authentication type, and the like. In some embodiments, account data is generated by the transaction device by processing/filtering the account information. For example, an account number can be encrypted/hashed to protect the account number. A transaction device may be implemented by a terminal, a point of sale (POS) device, or any other device that accepts account information. For example, a terminal includes a credit card terminal that processes payment based on a received credit card account number. The transaction device may receive and parse account information using a variety of electronic techniques such as a chip reader, a magnetic stripe reader, barcode scanner, etc. In some embodiments, a transaction device is associated with a location and may be identified by its associated location. For example, a brick and mortar retailer (BM) having three checkout terminals (7-3) each equipped with one of the transaction devices 702-706 may be identified by transaction devices BM7, BM2, and BM3. As another example, a transaction device is a website processing payment for goods and services purchased over the Internet.

A transaction location, which is typically associated with a transaction device, is a location where account information can be received to initiate a transaction. A transaction location may be a physical/geographical location, a location of a terminal, a Web location, and the like. Examples of transaction locations include checkout terminals, stores, a group of stores, or a system-wide (e.g., entire E-commerce merchant) location, and the like.

Misappropriated information (e.g., payment information) may be presented to a transaction device 702-706 for a purchase. If misappropriated information is used, then the transaction is fraudulent. During a transaction approval process or shortly after the transaction takes place, the disclosed techniques can be applied on the transaction to determine an action to take with respect to the transaction such as signaling that a transaction is potentially fraudulent. If applied during the transaction, a potentially fraudulent transaction may be prevented by declining the proffered payment method. If applied shortly after the transaction, the transaction may be reviewed and dis-approved or the payment method may be declined for subsequent transactions. This avoids future exploits of the payment method.

A transaction identified to be a potentially fraudulent transaction can trigger remedial action such as verifying with an issuer bank or with the card holder whether the card was used without authorization. If so, then the potentially fraudulent transaction is confirmed to be actually fraudulent. The determination of potentially fraudulent transactions may be used to block a payment type associated with the potentially fraudulent transaction from being used in the future. An anticipated transaction (e.g., future location or time) can be determined/predicted, and preempted by declining the payment type.

Gateway 710 receives transaction data from one or more transaction devices 702-706, routes the transaction data to network 720, and returns an approval or decline notice based on the approval process of network 720. Gateway 710 may include a payment acquirer or Internet Service Provider. For example, the payment acquirer may be software hosted on a third-party server that handles transmissions between a merchant (represented by transaction devices 702-706) and an issuer 730. In some embodiments, a gateway is associated with an acquiring bank (also referred to as a merchant bank). The acquiring bank is registered with a network 720, wherein the network represents a card association or card scheme (e.g., Visa®, MasterCard®, American Express®, etc.). The acquiring bank contracts with merchants to create and maintain accounts allowing the merchant to accept accounts such as credit and debit cards. In some embodiments, gateway 710 processes and encrypts the transaction data before routing the transaction data. In some embodiments, gateway 710 groups one or more transactions together and sends the batch of transactions to issuer 730 via network 720.

Network 720 is a platform for transmitting data between devices to support payment processing and electronic payments. In some embodiments, network 720 is associated with a credit card association or card scheme (e.g., Visa®, MasterCard®, American Express®, etc.) and supports communications between association members such as an acquiring bank (e.g., gateway 710) and an issuing bank (e.g., issuer 730). In some embodiments, network 720 implements a clearing house to provide clearing and settlement services. Network 720 determines an appropriate destination to route the transaction data. For example, several issuer banks may be members of the network. The network determines the issuer corresponding to the transaction data and routes the transaction to the appropriate issuer. For simplicity, only one issuer 730 is shown in FIG. 7. In some embodiments, network 720 filters the received transaction data. For example, network 720 may be aware of fraudulent accounts and determine whether the received transaction data includes a fraudulent account. Network 720 may include one or more network connected servers for processing, routing, and/or facilitating transactions.

Issuer 730 receives transaction data from network 720 and determines whether to approve or deny a transaction (e.g., a provided account/payment). For example, issuer 730 includes one or more servers/systems of an issuing bank. In some embodiments, the issuer is associated with an acquiring bank via network 720. In some embodiments, determining whether to approve or deny an account/payment method includes determining whether the transaction is potentially fraudulent.

Storage 744 stores information about transactions. Storage 744 can be implemented by or include a variety of storage devices including devices for a memory hierarchy (cache, RAM, ROM, disk). In some embodiments, storage 744 stores a list of potentially fraudulent transactions, a list (e.g., blacklist) of stolen/fraudulent accounts or other entities, and/or observed outcomes (e.g., labels) of previous transactions. The transaction information can be provided as a single transaction or a list of transactions. In some embodiments, a list of (past) transactions is stored in storage 744 for a predetermined time, and is used to analyze subsequently-received transactions to provide output.

A payment verification process may take place within the environment shown in FIG. 7. In operation, a transaction device (702, 704, and/or 706) receives transaction information such as account, time, amount, etc. as further described herein. In some embodiments, the transaction device processes the transaction information (e.g., packages the data). The transaction device sends the transaction data to gateway 710. Gateway 710 routes the received transaction data to network 720. Network 720 determines an issuer based on the transaction data, and sends the transaction data to the issuer. Issuer 730 determines whether to approve or deny the transaction and detects system problems or unusual flows of transactions based on the transaction data and a security process performed by one or more nodes 742.1, 742.2. One or more nodes 742.1, 742.2 performs security processes to analyze the received transaction data and identify anomalies. The processes shown in FIGS. 4 and 8-11 are examples of security processes performed by cluster 740.

Network 720 and gateway 710 relay an approval or decline notice back to the transaction device. If the transaction is approved, payment has been accepted and the transaction is successful. If the transaction is declined, payment has not been accepted and the transaction is declined.

In some embodiments, nodes of cluster 740 are controlled and managed by issuer 730. For example, devices/systems of the issuer or payment processing network retain transaction information and perform analysis to identify potentially fraudulent transactions. For example, the one or more nodes may be provided within the computing environment of issuer 730. In some embodiments, nodes of cluster 740 are controlled and managed by a third party. For example, issuer 730 has contracted with the third party to perform analysis using data provided to the issuer (e.g., transaction information) to identify for the issuer likely potentially fraudulent transactions.

Figure 8:
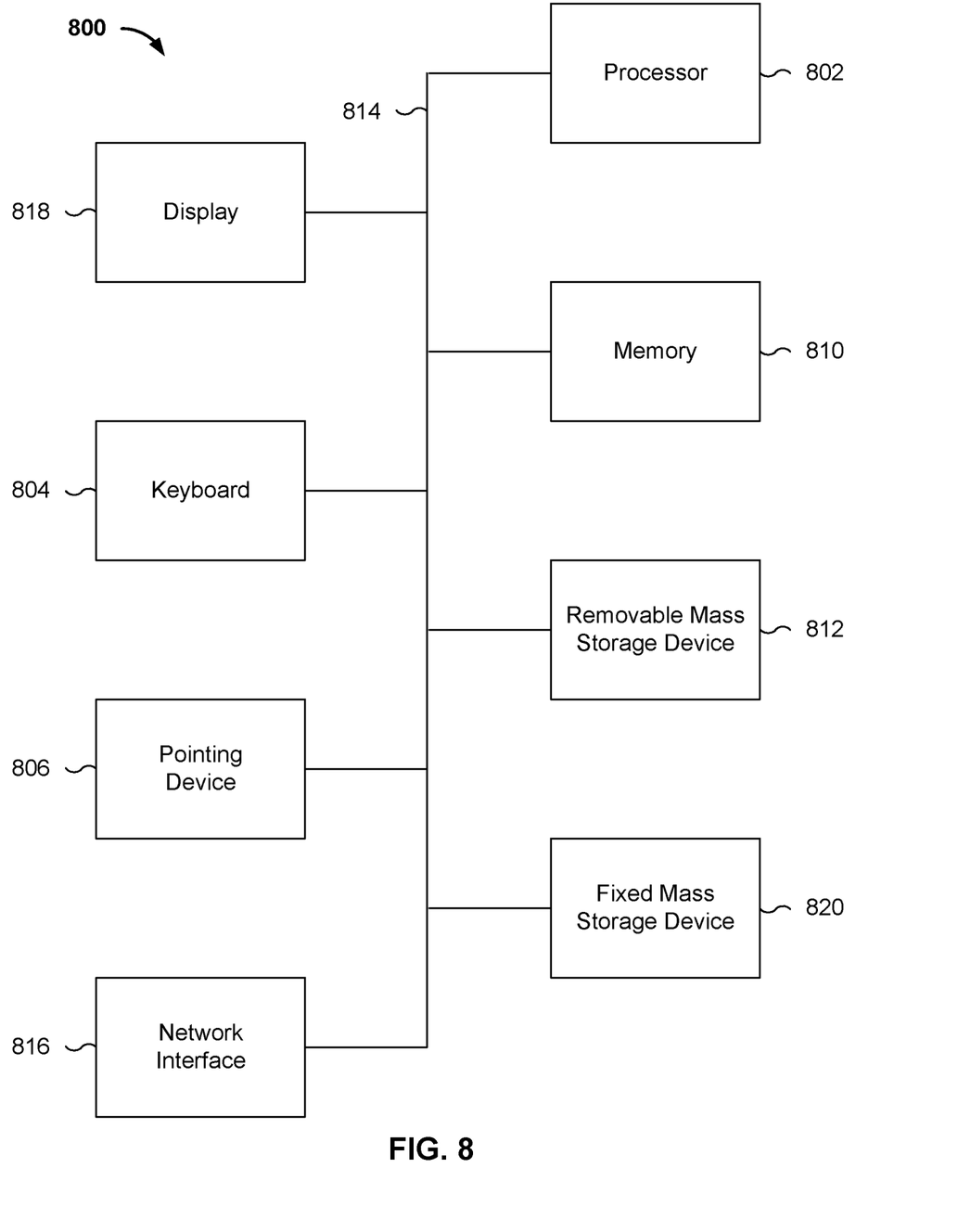
FIG. 8 is a functional diagram illustrating a programmed computer system for automatic profile extraction using recurrent neural networks in accordance with some embodiments.

FIG. 8 is a functional diagram illustrating a programmed computer system for automatic profile extraction using recurrent neural networks in accordance with some embodiments. As will be apparent, other computer system architectures and configurations can be used to perform the described techniques. Computer system 800, which includes various subsystems as described below, includes at least one microprocessor subsystem (also referred to as a processor or a central processing unit (CPU) 802). For example, processor 802 can be implemented by a single-chip processor or by multiple processors. In some embodiments, processor 802 is a general purpose digital processor that controls the operation of the computer system 800. In some embodiments, processor 802 also includes one or more coprocessors or special purpose processors (e.g., a graphics processor, a network processor, etc.). Using instructions retrieved from memory 810, processor 802 controls the reception and manipulation of input data received on an input device (e.g., pointing device 806, I/O device interface 804), and the output and display of data on output devices (e.g., display 818).

Processor 802 is coupled bi-directionally with memory 810, which can include, for example, one or more random access memories (RAM) and/or one or more read-only memories (ROM). As is well known in the art, memory 810 can be used as a general storage area, a temporary (e.g., scratch pad) memory, and/or a cache memory. Memory 810 can also be used to store input data and processed data, as well as to store programming instructions and data, in the form of data objects and text objects, in addition to other data and instructions for processes operating on processor 802. Also as is well known in the art, memory 810 typically includes basic operating instructions, program code, data, and objects used by the processor 802 to perform its functions (e.g., programmed instructions). For example, memory 810 can include any suitable computer readable storage media described below, depending on whether, for example, data access needs to be bi-directional or uni-directional. For example, processor 802 can also directly and very rapidly retrieve and store frequently needed data in a cache memory included in memory 810.

A removable mass storage device 812 provides additional data storage capacity for the computer system 800, and is optionally coupled either bi-directionally (read/write) or uni-directionally (read only) to processor 802. A fixed mass storage 820 can also, for example, provide additional data storage capacity. For example, storage devices 812 and/or 820 can include computer readable media such as magnetic tape, flash memory, PC-CARDS, portable mass storage devices such as hard drives (e.g., magnetic, optical, or solid state drives), holographic storage devices, and other storage devices. Mass storages 812 and/or 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can be used to provide access to other subsystems and devices as well. As shown, these can include a display 818, a network interface 816, an input/output (I/O) device interface 804, a pointing device 806, as well as other subsystems and devices. For example, image processing device 806 can include a camera, a scanner, etc.; I/O device interface 804 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 800. Multiple I/O device interfaces can be used in conjunction with computer system 800. The I/O device interface can include general and customized interfaces that allow the processor 802 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 816 allows processor 802 to be coupled to another computer, computer network, or telecommunications network using a network connection as shown. For example, through the network interface 816, the processor 802 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 8 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 804 and display 818 share the touch sensitive screen component, which both detects user inputs and displays outputs to the user). In addition, bus 814 is illustrative of any interconnection scheme serving to link the subsystems. Other computer architectures having different configurations of subsystems can also be utilized.

Examples in the domain of fraud detection are discussed herein, but this is not intended to be limiting and the disclosed techniques may be applied in any situation involving profiles or the like.

Embodiments of the present disclosure leverages the states of multiple RNNs as context vectors, replacing the profiles, and in this way solves multiple problems simultaneously. In one aspect, no extensive feature engineering phase is needed to identify proper profile features. In another aspect, the disclosed techniques allow a more complete context (as opposed to context for only a single entity) to be available in real-time for every event and any entity, at negligible extra cost. In yet another aspect, this richer context improves detection performance, ultimately lessening the costs incurred by clients. Therefore, embodiments of the present disclosure improve the technical field of automatic fraud detection because they do not require a trade-off between real-time, multi-entity profiles with real-time predictions, in turn yielding better detection performance.

Advantages of the Disclosed Techniques Include, Among Other Things:
  Reducing the time and resources spent on feature engineering (extracting features from raw data) by leveraging automatic feature extraction and representation learning; and
  Enhancing the available contextual information at decision time and improving detection performance, consequently mitigating costs associated with chargebacks and fraudulent activity, such as transaction fraud, account opening, money laundering, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
  receiving input sequence data associated with a stream of events;
  using a plurality of trained recurrent neural network machine learning models at least in part in parallel to determine different embedding output sets that represent at least a portion of the input sequence data in a plurality of different embedding spaces;
  providing the different embedding output sets to one or more classifier machine learning models to determine one or more classifier results, wherein:
    the one or more classifier machine learning models includes a respective classifier for a respective one of the trained recurrent neural network machine learning models;
    each of the one or more classifier machine learning models is configured to determine a score; and
  using the one or more classifier results to provide a prediction output including by combining the score determined by each of the one or more classifier machine learning models.

2. The method of claim 1, wherein at least one of the different embedding output sets represents at least a portion of the input sequence data in an embedding space of lower dimension than an original input space of the input sequence data.

3. The method of claim 1, wherein:
  a first one of the plurality of trained recurrent neural network machine learning models is configured for a first entity;
  a second one of the plurality of trained recurrent neural network machine learning models is configured for a second entity; and
  using the plurality of trained recurrent neural network machine learning models at least in part in parallel includes:
    determining, by the first one of the plurality of trained recurrent neural network machine learning models, a first embedding output set included in the different embedding output sets based on the received input sequence data; and
    determining, by the second one of the plurality of trained recurrent neural network machine learning models, a second embedding output set included in the different embedding output sets based on the received input sequence data.

4. The method of claim 1, wherein:
  the one or more classifier machine learning models are configured to extract relevant information to determine the one or more classifier results; and
  the one or more classifier results includes a score.

5. The method of claim 1, wherein using the one or more classifier results to provide the prediction output includes using raw data in combination with the combined score.

6. The method of claim 1, wherein using the one or more classifier results to provide the prediction output includes weighting a first entity more heavily than a second entity based at least in part on the first entity being expected to be more indicative of a characteristic than the second entity.

7. The method of claim 1, wherein the stream of events includes transactions.

8. The method of claim 7, wherein the one or more classifier results includes a score associated with a likelihood of an associated transaction being fraudulent.

9. The method of claim 7, wherein the prediction output includes a value indicating an associated transaction as being fraudulent.

10. The method of claim 1, wherein each of the trained recurrent neural network machine learning models is configured to learn context for a respective entity associated with an event in the stream of events.

11. The method of claim 1, wherein a first subset of the trained recurrent neural network machine learning models is trained in parallel with a second subset of the trained recurrent neural network machine learning models.

12. The method of claim 1, wherein at least one of the plurality of recurrent neural network machine learning models is trained using supervised training.

13. The method of claim 1, wherein at least one of the plurality of recurrent neural network machine learning models is trained using unsupervised training.

14. The method of claim 1, further comprising, prior to using the plurality of trained recurrent neural network machine learning models at least in part in parallel to determine the different embedding output sets that represent at least a portion of the input sequence data in the plurality of different embedding spaces:
    pre-processing the input sequence data including by determining at least one feature from the input sequence data.

15. The method of claim 1, further comprising performing a database operation in parallel for a plurality of states associated with the plurality of trained recurrent neural network machine learning models.

16. A method comprising:
    receiving input sequence data associated with a stream of events;
    using a plurality of trained recurrent neural network machine learning models at least in part in parallel to determine different embedding output sets that represent at least a portion of the input sequence data in a plurality of different embedding spaces including by, for each of the plurality of trained recurrent neural network machine learning models:
        retrieving a first state for a first transaction in the stream of events, wherein the first state is:
            a default state in the event the first transaction is associated with an entity that has not been previously seen, or
            a saved recurrent neural network state for an entity associated with the first transaction in the event the first transaction is associated with an entity that has been previously seen;
        providing the retrieved first state and an input data based on the first transaction to a respective recurrent neural network machine learning model to determine a new second state; and
        updating the saved recurrent neural network state for the entity associated with the first transaction to be the new second state;
    providing the different embedding output sets to one or more classifier machine learning models to determine one or more classifier results; and
    using the one or more classifier results to provide a prediction output, wherein the prediction output is determined using at least (i) the first state and (ii) the input data based on the first transaction.

17. A system, comprising:
    a processor configured to:
        receive input sequence data associated with a stream of events;
        use a plurality of trained recurrent neural network machine learning models at least in part in parallel to determine different embedding output sets that represent at least a portion of the input sequence data in a plurality of different embedding spaces;
        provide the different embedding output sets to one or more classifier machine learning models to determine one or more classifier results, wherein:
            the one or more classifier machine learning models includes a respective classifier for a respective one of the trained recurrent neural network machine learning models;
            each of the one or more classifier machine learning models is configured to determine a score; and
        use the one or more classifier results to provide a prediction output including by combining the score determined by each of the one or more classifier machine learning models; and
    a memory coupled to the processor and configured to provide the processor with instructions.

18. A computer program product embodied in a non-transitory computer readable medium and comprising computer instructions for:
    receiving input sequence data associated with a stream of events;
    using a plurality of trained recurrent neural network machine learning models at least in part in parallel to determine different embedding output sets that represent at least a portion of the input sequence data in a plurality of different embedding spaces;
    providing the different embedding output sets to one or more classifier machine learning models to determine one or more classifier results, wherein:
        the one or more classifier machine learning models includes a respective classifier for a respective one of the trained recurrent neural network machine learning models;
        each of the one or more classifier machine learning models is configured to determine a score; and
    using the one or more classifier results to provide a prediction output including by combining the score determined by each of the one or more classifier machine learning models.

* * * * *